(12) United States Patent
Uken

(10) Patent No.: US 6,379,055 B1
(45) Date of Patent: Apr. 30, 2002

(54) FIBER OPTIC CONNECTOR

(75) Inventor: William David Uken, Fremont, CA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/469,577

(22) Filed: Dec. 22, 1999

(51) Int. Cl.[7] .................................................. G02B 6/38
(52) U.S. Cl. ............................. 385/75; 385/76; 385/77
(58) Field of Search .............................. 385/75, 76, 77, 385/81, 72, 71; 225/96.5

(56) References Cited

U.S. PATENT DOCUMENTS

| | | | |
|---|---|---|---|
| 4,790,465 A | 12/1988 | Fellows et al. | ................. 225/2 |
| 4,900,877 A | 2/1990 | Dubrow et al. | ........ 174/35 GC |
| 5,253,935 A | 10/1993 | Uken et al. | ............... 350/96.16 |
| 5,301,868 A * | 4/1994 | Edwards et al. | ............ 225/96.5 |
| 5,312,468 A | 5/1994 | Yin et al. | ......................... 65/2 |
| 5,475,779 A | 12/1995 | Uken et al. | ..................... 385/32 |
| 5,839,635 A | 11/1998 | Mansfield et al. | ......... 225/96.5 |
| 6,085,004 A * | 7/2000 | Dower et al. | ................. 385/80 |

FOREIGN PATENT DOCUMENTS

| | | |
|---|---|---|
| EP | 0 266 524 A | 5/1988 |
| FR | 2 560 392 A | 8/1985 |

OTHER PUBLICATIONS

Product Brochure of Specialized Products Company, p. 86.

* cited by examiner

Primary Examiner—Mohammad Sikder

(57) ABSTRACT

A connector for terminating optical fibers. The connector includes first and second housing portions for mating with each other. When the optical fiber is inserted into the first housing portion, a strain is pre-applied to the optical fiber. The second housing portion includes a blade such that when the first and second housing portions mate, the blade cleaves the optical fiber without additional preparation of the fiber, for example, without removal of a portion of the buffer.

12 Claims, 2 Drawing Sheets

FIBER OPTIC CONNECTOR

FIELD OF THE INVENTION

The present invention relates to a connector for optical fibers.

BACKGROUND OF THE INVENTION

Various applications employ optical fibers for data transmission, including Local Area Networks (LANs), industrial plants, automobiles and aerospace. Typically, these optical fibers are constructed of glass with a polymeric buffer sheath. In order to form a connection between the fibers, and between the fibers and electro-optical devices, the buffer is stripped and the optical fiber must then be carefully cleaved and polished in order to form an acceptable connection. A separate cleaving tool and/or polishing device is often required which may be costly or require training to terminate the optical fiber. Additionally, the cleaving tool or polishing device may be misplaced or otherwise unavailable at the time of termination. It is a time consuming and craft-sensitive process to cleave and polish the optical fiber for connection into existing connectors.

SUMMARY OF THE INVENTION

I have developed a connector which is economical and easy to install. The connector includes first and second housing portions for mating with each other. When the optical fiber is inserted into the first housing portion, a strain is pre-applied to the optical fiber. The second housing portion includes a blade such that when the first and second housing portions mate, the blade cleaves the strained optical fiber without additional preparation of the fiber, for example, without the need for removal of a portion of the buffer.

One aspect of the invention comprises a fiber optic connector comprising:

first and second housing portions for mating with each other;

means for positioning an optical fiber in said first housing portion; and a blade housed in said second housing portion, said blade being configured for cleaving the optical fiber when said first and second housing portions are mated.

Another aspect of the invention comprises a method of interconnecting optical fibers comprising:

inserting said fiber into a first housing portion;

positioning said fiber around a curvature formed on said first housing portion to strain said fiber; and mating a second housing portion with said first housing portion;

cleaving said optical fiber with a blade positioned in said second housing portion, said fiber strain being partially relieved by said cleaving; and receiving said fiber into a groove in said second housing portion.

DETAILED DESCRIPTION OF THE PREFERRED EMBODIMENTS

Figure 1:
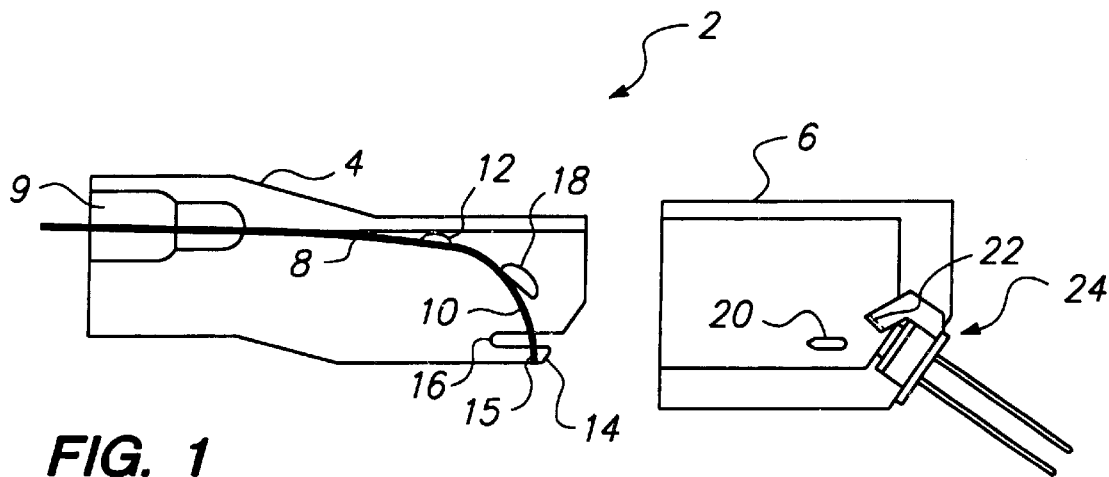
FIG. 1 illustrates portions of the connector of the present invention including an optical fiber prior to initial mating of the housing portions.

In accordance with the preferred embodiment of the present invention, an optical fiber is cleaved upon mating of two portions of a connector. The optical fiber is typically a glass fiber having a polymeric buffer surrounding the core. The optical fiber is terminated without additional preparation, such as removing the buffer prior to mating of the connector portions.

The connector includes first and second housing portions that mate with each other. The optical fiber is received by the first housing portion and a pre-strain is applied to the optical fiber to facilitate cleaving. The second housing portion includes a blade and is mated with the first housing portion. The blade cleaves the optical fibers as the first and second housing portions mate. In the preferred embodiment, the blade is received in a slot formed in the first housing portion.

The optical fiber is inserted into the first housing portion and positioned such that the strain is created by wrapping the fiber around a curvature formed on the first housing portion. The curvature is of a pre-defined radius which properly strains and positions the optical fiber. To further aid in accurately positioning the optical fiber, a detent or serpentine path may be provided in the first housing portion. Because the optical fiber is cleaved while under strain, the resultant cleaved fiber has a clean face which need not be polished or otherwise finished to form an acceptable optical connection.

Once the fiber is inserted into the first housing portion, it is preferably sized to avoid an excessive fiber trail. Excess fiber is removed by wrapping the fiber around a radius formed on an edge of the first housing portion. The radius is sized small enough to shatter the optical fiber and facilitate breaking off of the excess fiber as the fiber is wrapped around the radius. The radius is formed on an edge of the first housing portion so that, when excess fiber is removed, a portion of the fiber still extends beyond the slot formed in the first housing portion.

The first housing portion is preferably a male connector portion which slides into the second housing portion, preferably a female connector portion. In an alternate embodiment of the present invention, the second housing portion could be a male connector portion and the first housing portion could be a female connector portion. It is within the scope of the present invention to provide a connector which need not include male-female connector housing portions, but, rather, may include any other type of pairs of housing portions which mate.

The first and second housing portions are capable of being mated and demated multiple times. As will be described below, the blade engages the optical fiber only during the first mating cycle with a particular optical fiber. In subsequent matings, the optical fiber is clear of the blade as the first and second housings mate.

The blade can be permanently affixed to the second housing portion, or may be removable and/or replaceable. The blade is preferably a carbide blade having an angle of between about 40 and 75°, preferably between 55 and 75°, more preferably about 60°.

A second detent may be disposed on the first housing portion for locating the fiber after cleaving. A groove may also be formed in the second housing portion for aiding in precisely locating the optical fiber. When strain is removed from a bent optical fiber, it tends to return to a straightened condition. Once the fiber is cleaved, strain is relieved and the fiber moves away from the curvature formed on the first housing portion, straightening and moving into a position held by the second detent on the first housing portion. The optical fiber is also then received in the groove formed in the second housing portion. When cleaved and straightened, the fiber clears the slot such that, upon demating and subsequent re-mating of the first and second housing portions, the blade will not engage the particular fiber (which has already been cleaved) a second time. It is noted that another optical fiber, or the same optical fiber reinserted into the first housing portion, may again be cleaved when the first and second housing portions mate.

The connector preferably includes fiber debris retention means for retaining the end of the fiber that is cleaved. The fiber debris retention means may be in the form of a pocket or recess formed in the second housing portion or gripping means formed in first housing portion.

For applications in which vibration or other stress on the connector is anticipated, it may be desirable to include a releasable locking mechanism for maintaining the first and second housing portions in their mated condition. The locking mechanism may be a snap-fit or other mechanism.

The second housing portion is preferably optically functional; however, it may be employed only to cleave the fiber. In the case of an optically non-functional second housing portion, the optically non-functional second housing portion would thereafter be replaced by an optically functional second housing portion. The optically non-functional second housing portion and the optically functional second housing portion are formed from the same mold, the only significant difference being that the functional housing portion includes components for forming a connection between fibers or between fibers and an electro-optical device.

Referring now to the drawings, FIG. 1 illustrates a connector 2 including first housing portion 4 and second housing portion 6. An optical fiber 8 is inserted into first housing portion 4 through opening 9 and wrapped around curvature 10. Optical fiber 8 is received by detent 12 and/or a serpentine path, if provided in first housing portion 4. The fiber 8 is sized by being wrapped around radius 14 and shattered. The fiber extends beyond slot 16 formed in first housing portion 4.

Figure 2:
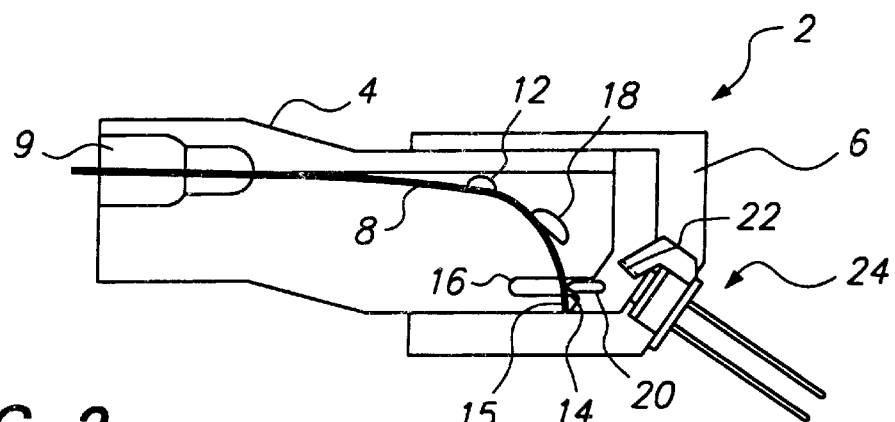
FIG. 2 illustrates the connector of the present invention as the housing portions are mating, immediately prior to cleaving of the fiber.
Figure 3:
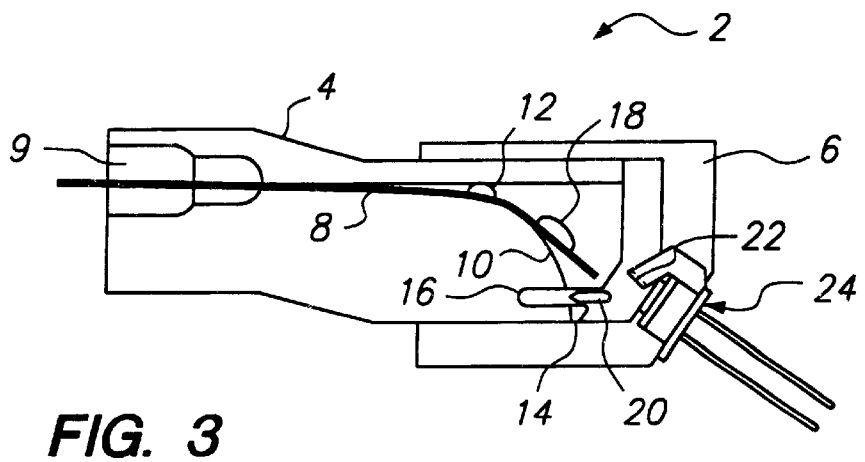
FIG. 3 illustrates the connector of the present invention upon cleaving of the fiber.
Figure 4:
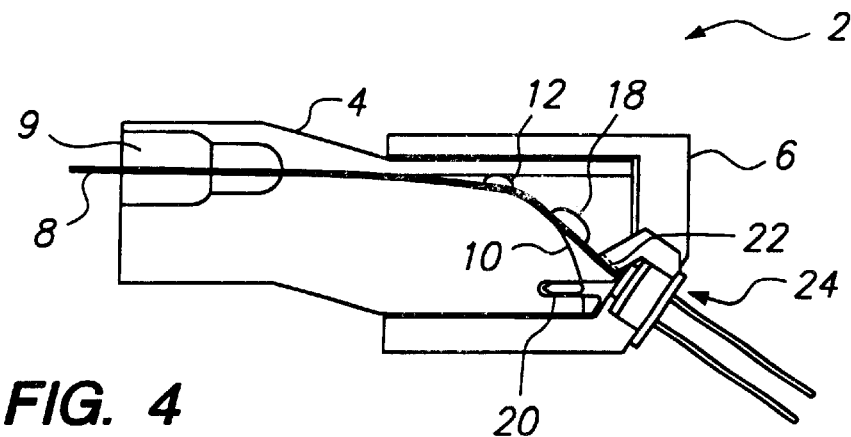
FIG. 4 illustrates the connector of the present invention upon being fully mated after cleaving of the fiber.

FIG. 2 illustrates first and second housing portions 4, 6 as they are in the process of being mated by sliding first housing portion 4 into second housing portion 6. As blade 20 encounters optical fiber 8, the fiber is cleaved, strain is relieved and the fiber begins to straighten, as seen in FIG. 3. Upon straightening, fiber 8 clears slot 16. Detent 18 catches and locates fiber 8. As housing portions 4, 6 are fully mated, groove 22 engages and more precisely locates fiber 8. (See FIG. 4.) Fiber debris retention means catches waste section 15 of fiber 8 so that the waste section does not interfere with the connection or a sliver of fiber does not injure an operator or user of the connector.

A connection between fiber 8 and an electro-optical device or another fiber is made at the location shown by device 24. In the embodiment in which an optically non-functional second housing portion has been employed, the second housing is removed and replaced with an optically functional second housing portion that has a molded body substantially identical in configuration to the optically non-functioning housing portion.

Figure 5:
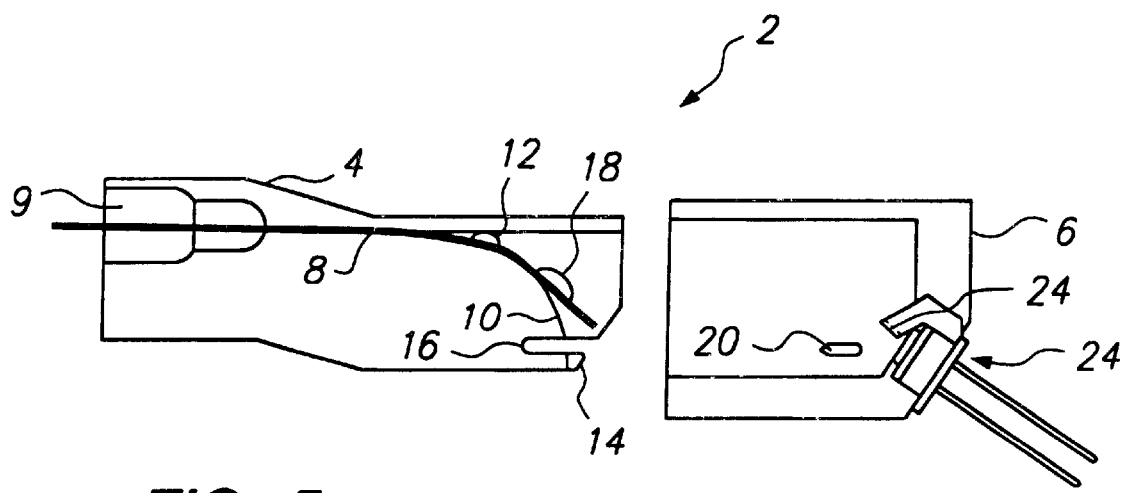
FIG. 5 illustrates the connector of the present invention after demating of the housing portion.

First and second housing portions 4, 6 are capable of being mated and demated multiple times. FIG. 5 shows connector 2 demated, after fiber 8 has been cleaved and clears slot 16. Blade 20 engages the fiber only during the first mating cycle with a particular optical fiber. In subsequent matings, fiber 8 is clear of blade 20 as the first and second housings 4, 6 mate.

Variations and modifications can be made to the preferred embodiments of the present invention without departing from the scope of the present invention, which is limited only by the following claims.

What is claimed is:

1. A fiber optic connector comprising:

first and second housing portions for mating with each other;

means for positioning an optical fiber in said first housing portion; and a blade housed in said second housing portion, said blade being configured for cleaving the optical fiber upon mating of said first and second housing portions.

2. The fiber optic connector as defined in claim 1 wherein said blade is permanently affixed to said second housing portion.

3. The fiber optic connector as defined in claim 1 wherein said blade cleaves the optical fiber through a buffer.

4. The fiber optic connector as defined in claim 1 wherein said means for positioning the optical fiber comprises a curvature formed on said first housing portion.

5. The fiber optic connector as defined in claim 4 wherein said curvature provides a predefined radius.

6. The fiber optic connector as defined in claim 1 wherein said connector is capable of being mated and demated multiple times.

7. The fiber optic connector as defined in claim 6 wherein said blade engages the optical fiber only during the first mating cycle for connection with a particular optical fiber.

8. The fiber optic connector as defined in claim 1 further comprising fiber debris retention means.

9. The fiber optic connector as defined in claim 1 further comprising means for locating the optical fiber after cleaving.

10. The fiber optic connector as defined in claim 9 wherein said means for locating the optical fiber comprises a groove disposed in said second housing portion.

11. The fiber optic connector as defined in claim 10 wherein said means for locating further comprises a detent disposed in said first housing portion.

12. The fiber optic connector as defined in claim 1 further comprising means for sizing the optical fiber including a radius formed on the first housing portion of a size small enough to shatter the optical fiber as the fiber is wrapped around the radius.

* * * * *